United States Patent [19]
DuPasquier et al.

[11] Patent Number: 6,122,092
[45] Date of Patent: Sep. 19, 2000

[54] REVERSIBLE INORGANIC ELECTROCHROMIC SOLUTION DEVICE

[75] Inventors: Aurelien DuPasquier, Red Bank, N.J.; Jean-Marie Tarascon, Amiens, France

[73] Assignee: Telcordia Technologies, Inc., Morristown, N.J.

[21] Appl. No.: 09/317,079

[22] Filed: May 20, 1999

[51] Int. Cl.$^7$ .................................................. G02F 1/153
[52] U.S. Cl. .......................... 359/272; 359/265; 359/266; 359/270; 359/273; 204/418; 252/586
[58] Field of Search ..................... 359/265, 266, 359/267, 269, 271, 272, 273, 270; 204/418; 252/586, 582

[56] References Cited

U.S. PATENT DOCUMENTS

| | | | |
|---|---|---|---|
| 4,235,528 | 11/1980 | Yano et al. | 359/271 |
| 5,232,574 | 8/1993 | Saika et al. | 204/418 |
| 5,864,420 | 1/1999 | Udaka et al. | 359/270 |
| 5,880,872 | 3/1999 | Udaka | 359/273 |
| 5,923,456 | 7/1999 | Tench et al. | 359/266 |
| 5,985,184 | 11/1999 | Lynam | 359/265 |
| 6,002,511 | 12/1999 | Varaprasad et al. | 359/265 |
| 6,045,725 | 4/2000 | Udaka et al. | 252/586 |

*Primary Examiner*—Loha Ben
*Attorney, Agent, or Firm*—David A. Hey

[57] ABSTRACT

An electrochromic device (10) of reversible light-transmissivity comprises a pair of spaced-apart window plate members (11, 13) bearing electrically-conductive surface layers (12, 14) and containing an electrochromotropic electrolyte solution in the intervening space (16). The electrolyte comprises an aqueous inorganic solution of a silver salt and may further comprise a salt of a transition metal. The electrolyte solutions are responsive to varying applied voltages by transitioning between solution phases of varying light-transmissivity which, depending upon solution composition, may be persistent or passively reversible.

6 Claims, 4 Drawing Sheets

REVERSIBLE INORGANIC ELECTROCHROMIC SOLUTION DEVICE

BACKGROUND OF THE INVENTION

The present invention relates to electrochromic devices which, in general, respond to varied levels of applied electrical voltage by changing light reflectivity or opacity. Such devices are particularly useful for providing visually-variable transparency or color in windows, mirrors, display panels, and the like. The invention is directed in particular to inorganic electrochromic electrolyte compositions, and incorporating devices, comprising aqueous solutions having electrically-responsive chromotropic species which may be repeatedly cycled between varied states of visual opacity or color display.

Currently-available electrochromic compositions and devices are for the most part prepared from either ion insertion materials or reversible electrodeposition materials. The former group includes such compositions as $WO_3$ and Prussian Blue (ferric hexacyanoferrate) which respond to electrically-induced ion intercalation by changing color. Reversibility of such color change relies upon deintercalation of acquired ions in response to the reversal of applied electrical polarity. Consequently, the response time and state persistence for such compositions depends upon the ease of effecting the respective intercalation phases. Larger intercalated ions can thus severely restrict the practical utility, as well as limit the useful life span, of ion insertion devices.

Materials of the electrodeposition group utilize the electrolytic plating of metals, such as bismuth or copper, from solutions of their salts to achieve desired color or opacity change. As with the physical limitations affecting insertion materials, the ease of plating and dissolution of plated layers determines the response rate and reversibility of an electrochromic device based upon electrodeposition. Although increased gradients in applied electrical potential may achieve desired responses, components of the electrochromic device are often adversely affected with resulting loss of useful life.

Additional electrochromic compositions have been proposed which typically comprise exotic, costly electrochromotropic organic compounds and polymers. Such materials, however, in addition to their economic limitations, often exhibit distinct loss of chromophoric activity over time, thus making their commercial use unappealing.

Overcoming the "inertial" limitations of prior electrochromic compositions, that is, the natural resistance to large ion intercalation or to metal plate dissolution, is a prerequisite to the rapid response and long cycling life necessary for commercially acceptable devices. Economic considerations also contribute significantly to effective material applications. By avoiding such limitations through the use of variable phase inorganic solutions, the present invention provides a means for enabling low-threshold chromotropic activity as well as extended useful life in commercially viable electrochromic light valve or variable display devices.

SUMMARY OF THE INVENTION

An electrochromic device incorporating a variably light-transmissive electrolyte solution according to the present invention is structured in typical manner as generally depicted in FIG. 1, comprising a pair of facing electrode plates, of which at least one is transmissive, forming an intermediate cell space to contain the electrochromic solution. The facing plate surfaces carry respective electrically-conductive, normally light-transmissive electrode coatings by which a voltage from an outside source may be impressed upon an enclosed active solution.

In contrast to the ion insertion or plating compositions, or those relying upon economically undesirable organic compounds, previously suggested for electrochromic devices, the compositions of the present invention comprise simple, primarily aqueous, electrolyte solutions of inorganic compounds which respond rapidly and reversibly, between variedly-colored solution species, to applied electrical stimulus.

Useful such compositions comprise dissolved silver salts or complexes of their solutions, or, preferably, solutions comprising combinations of silver salts and salts of transition metals, such as cobalt and nickel. A first embodiment of the invention may be realized in a silver-amine complex solution which is prepared by the addition of increasing amounts of ammonium hydroxide to an aqueous solution of silver nitrate with resulting progression through various solution phases:

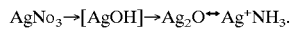

$$AgNo_3 \rightarrow [AgOH] \rightarrow Ag_2O \rightarrow Ag^+NH_3.$$

The $Ag^+NH_3$ complex solution is reversibly transformed by application of electrical voltage from its original transparency to an opaque silver oxide solution phase at the anode of the electrochromic cell device. The transformation to opaque phase is rapid and persistent in that the opacity remains for a significant time after interruption of the initial activating voltage application. Reversal of applied voltage polarity results in equally rapid return to the transparent complex phase, likely following the equilibrium phase transitions occurring in the ammoniacal solution.

More preferred embodiments comprise mixed silver and transition metal salts, for example, $AgNO_3$ with $Ni(NO_3)_2$ or $Co(NO_3)_2$, in acidic solution. These compositions exhibit less tendency toward cathodic deposition of metallic silver than the higher pH solutions and are thus more readily cleared in response to polarity reversal and possess a higher degree of reversibility after extensive cycling.

BRIEF DESCRIPTION OF THE DRAWING

The present invention will be described with reference to the accompanying drawing of which.

DESCRIPTION OF THE INVENTION

Figure 1:
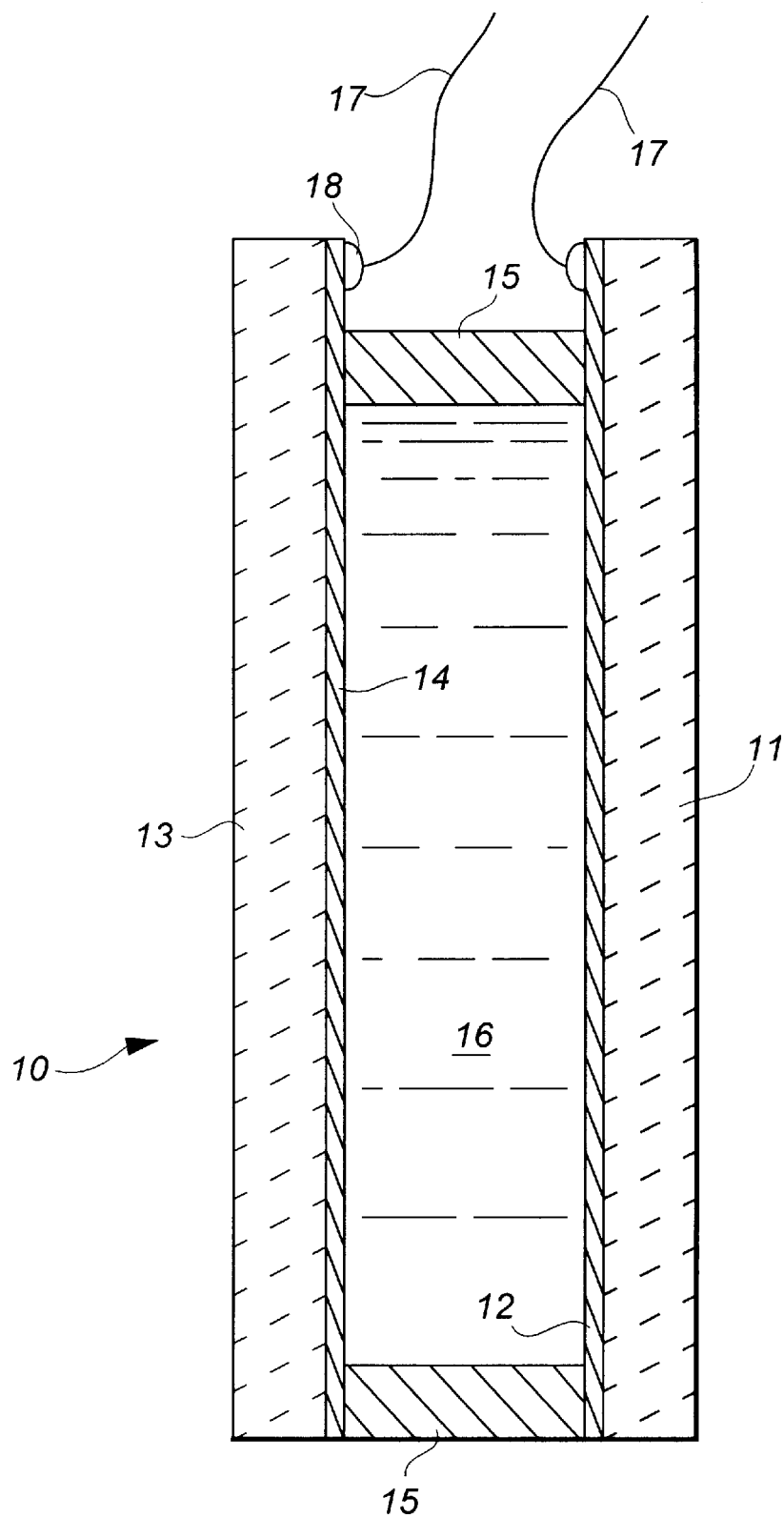
FIG. 1 is a diagrammatic representation in cross-section of an electrochromic device structure useful in the present invention.

A typical electrochromic device structure useful in the present invention as depicted in FIG. 1 includes a pair of glass plates 11, 13, and bearing coatings 12, 14 of transparent electrically-conductive composition, such as indium tin oxide or fluorine-doped tin oxide. These commercially-available plate members comprise the electrodes of the device and may be readily attached, such as by means of solder contacts 18 at their conductive surfaces, to electrical conductors 17 which are in circuit with a source of reversible-polarity voltage, not shown. Separator member 15 of electrically-insulative, inert sealing material, such as a silicone gasket or mastic-adhered glass spacer, maintains a desired distance between the electrodes and contains an electrochromically-active solution within the intervening cell space 16. In the following examples describing embodiments of the invention, the experimental device was fabricated of fluorine-doped tin oxide glass plates 11, 13 with 4.0 mm insulating glass spacers 15 at three sides to form a transparent, open-ended cell with about 15 cm$^2$ major faces. The various electrochromic solutions were easily introduced into cell space 16 for testing by simple pipette injection. Electrical conductors 17 were reversibly connected in circuit with the terminals of a 4.05 V lithium-ion battery to obtain the respective darkened and transparent phases of the following exemplary electrochromic solutions.

EXAMPLE 1

Figure 2:
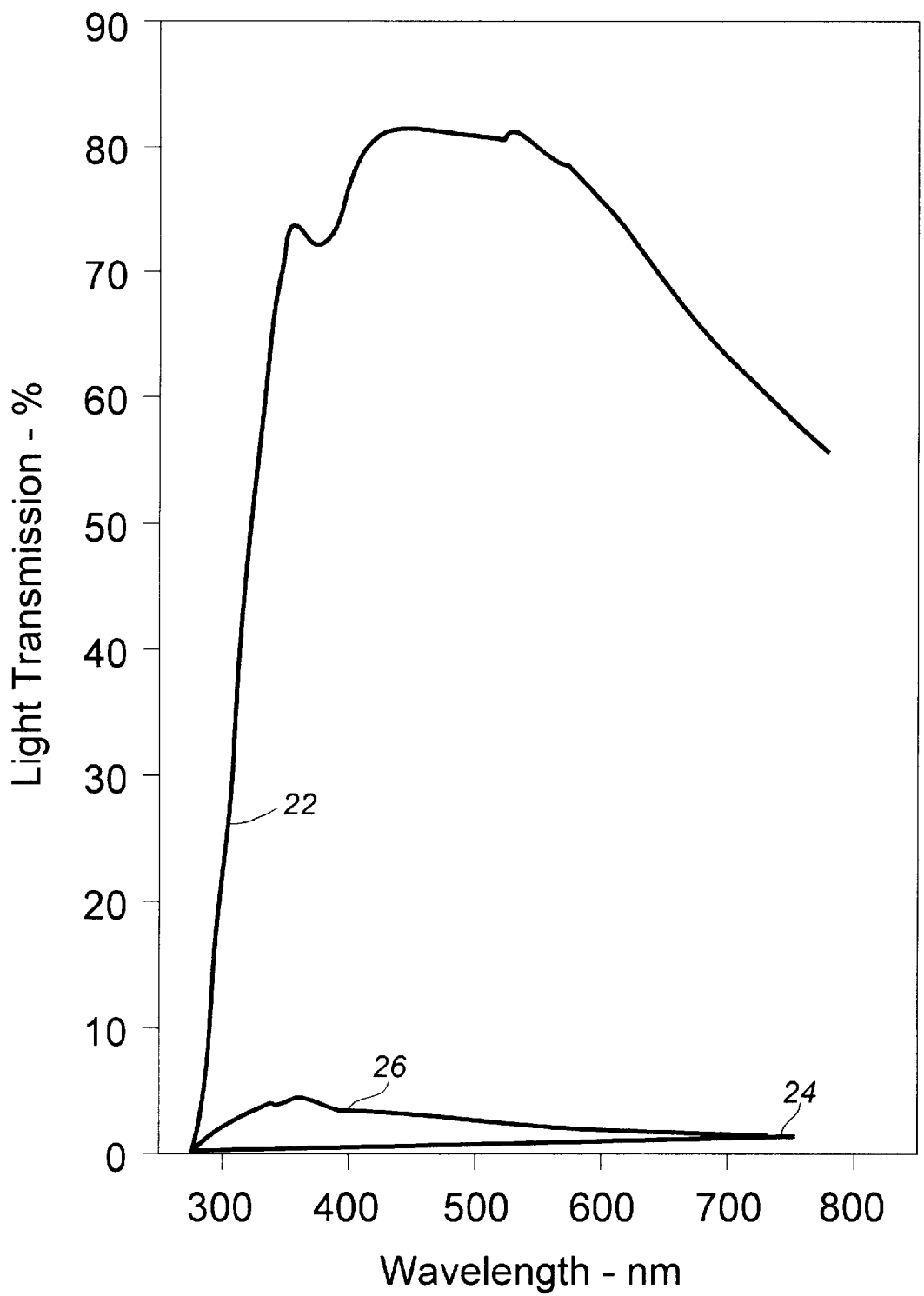
FIG. 2 is a graphical representation of the reversible light-transmissive characteristics of one embodiment of the present invention.

To a 0.1 M solution of $AgNO_3$ in deionized water was slowly added 50% aqueous $NH_4OH$ through the dark brown $Ag_2O$ phase to the transparent end point of the $Ag^+NH_3$ solution phase. This solution, substantially stable at pH 10.5, was inserted into the earlier-described test cell device. The cell appeared substantially transparent and exhibited a measured transmissivity up to about 80% over the range of 300–800 nm as represented by trace 22 of FIG. 2. Conductors 17 of the test cell were then placed in circuit with the battery and within a few seconds the solution visibly darkened with the formation of the $Ag_2O$ solution phase. Measured transmissivity had decreased to a maximum of about 2% as shown by trace 24 of FIG. 2. This low level of light transmission persisted upon interruption of the applied voltage. Reversal of the polarity of applied voltage increased the transmissivity of the cell solution with the shifting from $Ag_2O$ to $Ag^+NH_3$ solution phase. Greater transparency of the device beyond a measured maximum of about 4% shown at trace 26 was apparently countered, however, by the persistence in the ammoniacal solution of a metallic silver film at the original cathode surface.

EXAMPLE 2

Figure 3:
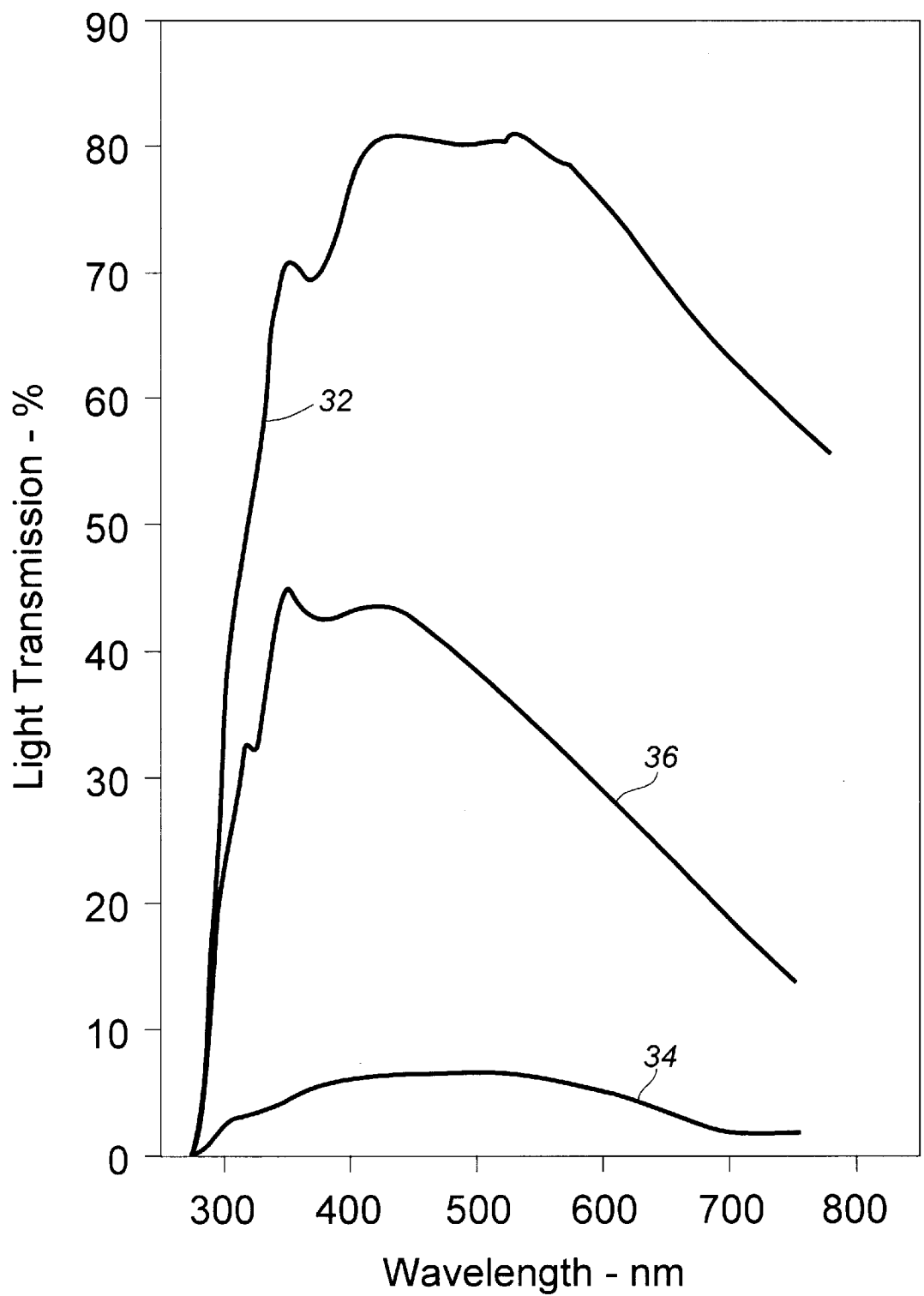
FIG. 3 is a graphical representation of the reversible light-transmissive characteristics of another, preferred embodiment of the present invention.

A mixture of 0.01 M $AgNO_3$ and 0.001 M $Ni(NO_3)_2$ was prepared with dilute nitric acid and deionized water. The resulting aqueous solution appeared transparent and stable at the pH of about 1.0. This solution was inserted into the test cell device and exhibited a measured transmissivity up to a maximum of about 80% as is depicted in trace 32 of FIG. 3. The device was connected in circuit with the battery and rapidly darkened visibly at a voltage of about +3.0 V to a maximum transmissivity of about 6% as seen at trace 34 of FIG. 3. Upon interruption of the applied voltage, however, loss of density in the coloration became apparent over the period of a few minutes with the transmissivity of the cell registering a no-voltage recovery to about 45% as at trace 36 of FIG. 3. The persistency of coloration attributable to the $Ag_2O$ solution phase is apparently adversely affected by the acidic nature of the solution. Applied voltage of reverse polarity to about −1.5 V resulted in substantially full recovery of the transparent solution phase to the maximum shown at trace 32. Comparable results were obtained up to about an equal mole ratio of solutes.

EXAMPLE 3

Figure 4:
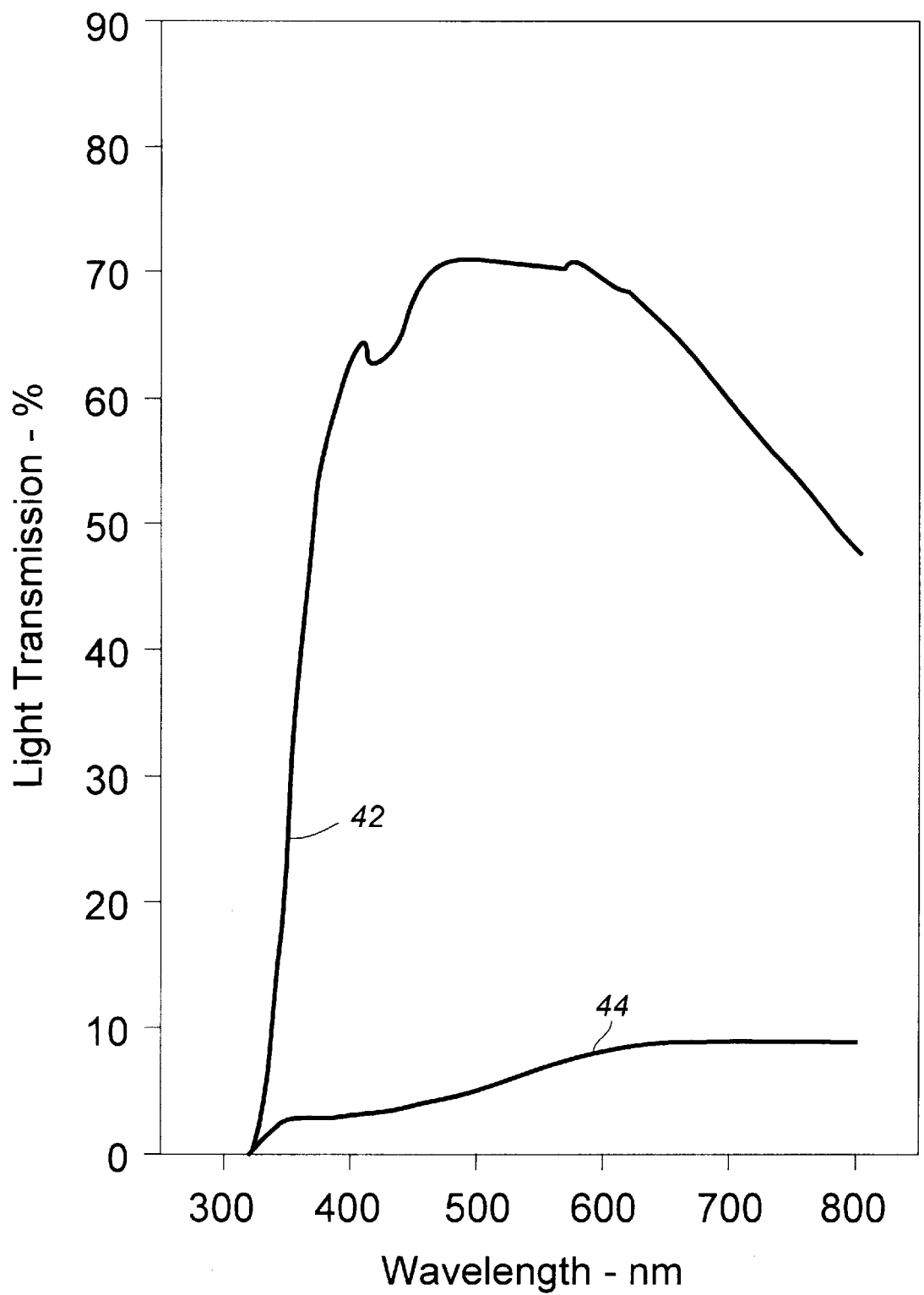
FIG. 4 is a graphical representation of the reversible light-transmissive characteristics of an additional preferred embodiment of the present invention.

A mixture of 0.01 M $AgNO_3$ and 0.001 M $Co(NO_3)_2$ was prepared with deionized water. The resulting aqueous solution appeared transparent and stable at the pH of about 2.5. This solution was inserted into the test cell device and exhibited a measured transmissivity up to a maximum of about 70% as is depicted in trace 42 of FIG. 4. The device was connected in circuit with the battery and rapidly darkened visibly to a measured maximum transmissivity of about 10% as seen at trace 44 of FIG. 4. This level of opacity persisted for a substantial time despite interruption of the applied voltage. The increase in persistency of coloration may be attributable to the less acidic nature of the solution. Applied voltage of reverse polarity resulted in substantially full recovery of the transparent solution phase to the maximum shown at trace 42. Up to equal molar proportions of solutes responded similarly.

It is expected that variants in the composition and fabrication of the electrochromic devices disclosed in the foregoing description will occur to the skilled artisan through the exercise of ordinary aptitude, and such variants are nonetheless intended to be included within the scope of the present invention as set out in the appended claims.

What is claimed is:

1. A reversible electrochromic device comprising a pair of spaced-apart electrode members, at least one of which is significantly light-transmissive, and a body of electrochromotropic electrolyte contained therebetween, said electrolyte body being responsive with differing degrees of light transmissivity upon the application of differing levels of electrical voltage across said electrode members characterized in that said electrolyte comprises an aqueous inorganic solution of a composition of silver salt capable of responding to application of each of at least two different voltages by reversibly transitioning between respective solution phases exhibiting different degrees of light transmissivity.

2. An electrochromic device according to claim 1 wherein said electrolyte comprises an ammoniacal solution of silver nitrate.

3. An electrochromic device according to claim 1 wherein said electrolyte comprises an acidic solution of silver nitrate and at least one transition metal salt.

4. An electrochromic device according to claim 3 wherein said transition metal salt is selected from the group consisting of cobalt and nickel.

5. An electrochromic device according to claim 3 wherein said transition metal salt is selected from the group consisting of nitrates of cobalt and nickel.

6. An electrochromic device according to claim 3 wherein said silver nitrate and said at least one transition metal salt are in a molar ratio of about 1:1 to 10:1.

* * * * *